United States Patent [19]

Brown

[11] Patent Number: 4,684,000

[45] Date of Patent: Aug. 4, 1987

[54] POWER TRANSMISSION DISCONNECT DEVICE WITH AN OPERATIONAL INTERLOCK

[75] Inventor: Neil L. Brown, Stillman Valley, Ill.

[73] Assignee: Sundstrand Corporation, Rockford, Ill.

[21] Appl. No.: 631,982

[22] Filed: Jul. 16, 1984

[51] Int. Cl.$^4$ .................. F16D 11/00; F16D 43/02
[52] U.S. Cl. .................. 192/67 R; 192/103 R; 192/114 R
[58] Field of Search .......... 192/30 W, 67 R, 82 P, 192/103 R, 105 CF, 114 R

[56] References Cited

U.S. PATENT DOCUMENTS

| 1,512,114 | 10/1924 | Leffler | 192/103 R X |
| 3,333,662 | 8/1967 | King et al. | 192/103 R X |
| 4,340,133 | 7/1982 | Blersch | 192/30 W |

FOREIGN PATENT DOCUMENTS 553775 1/1960 Belgium .................. 192/114 R

Primary Examiner—Rodney H. Bonck
Assistant Examiner—Alan G. Towner
Attorney, Agent, or Firm—Wood, Dalton, Phillips, Mason & Rowe

[57] ABSTRACT

A power transmission disconnect device with an operational interlock wherein a pair of clutch members are selectively engageable to transmit power from an input gear to an output shaft. Remotely operable means acts through a throwout sleeve to position a disconnect shaft to have the clutch members either engaged or disengaged. An operational interlock responsive to the speed of an input gear to the disconnect device prevents actuation of the clutch to either engaged or disengaged position when said speed is above a predetermined speed. Sensors are associated with the structure to assist in proper operation of the disconnect device.

19 Claims, 4 Drawing Figures

POWER TRANSMISSION DISCONNECT DEVICE WITH AN OPERATIONAL INTERLOCK

DESCRIPTION

1. Technical Field

This invention pertains to a power transmission disconnect device and, more particularly, to such a device with an operational interlock whereby a change in the relation between disengageable driving and driven clutch members can only be made when the drive input to the disconnect device is below a certain predetermined speed. The power transmission disconnect device with an operational interlock has particular utility as part of an airframe-mounted accessory drive system gearbox. Such an accessory drive system includes electrical generators, hydraulic pumps and/or other rotary drive components driven by the gearbox. The power transmission disconnect device provides for disconnecting a power transmission shaft from driven components of the drive system gearbox and with the disconnection or reconnection only occurring below a predetermined speed of the driving clutch member.

2. Background Art

A power transmission disconnect device functions in a drive train to selectively drive an output member from a drive input. Such a disconnect device commonly has a jaw tooth clutch comprising driving and driven clutch members which can be in driving engagement or move to disengaged positions for disconnecting the drive.

Such a power transmission disconnect device is used in many aircraft which have an accessory drive system remotely located from and driven by an engine of the aircraft. The accessory drive system normally consists of a gearbox from which electrical generators, hydraulic pumps and other rotary drive components are driven and to which they may be mounted. The aircraft may also include an engine starter which can be used to drive the accessories with the main engine disconnected.

The known power transmission disconnect devices have not provided for remote operation with an operational interlock to prevent operation of the disconnect device above a certain predetermined drive speed and with positive position control and sensors indicating full engagement or disengagement of the clutch members of the disconnect device.

Certain types of operational interlocks are known in the art. One example of such operational interlock is used in a power take-off apparatus wherein flyweights are operable in response to the speed of rotation of a flyweight mounting to lock together driving and driven members.

Another known operational interlock utilizes pivoted pawls responsive to a speed of rotation to prevent engagement of clutch elements until a certain rotational speed is reached.

The aforesaid operational interlocks do not disclose speed-responsive means operational to prevent either engagement or disengagement of driving and driven clutch members above a certain rotational speed of the input drive to the power transmission disconnect device.

DISCLOSURE OF THE INVENTION

A primary feature of the invention is to provide a power transmission disconnect device with an operational interlock which will prevent inadvertent operation of the disconnect device above a predetermined speed of rotation of the input drive into the device.

Another feature of the invention is to provide a power transmission disconnect device as defined in the preceding paragraph wherein the operation of the device is achieved by remotely controlled means, with there being positive positioning of the disconnect device with either the clutch members engaged or disengaged and with a sensor indicating clutch engagement.

In accordance with the foregoing features, it is an object of the invention to provide a power transmission disconnect device having a disengageable clutch with driven and driving clutch members and having means responsive to the speed of the driving clutch member to prevent any change in the coupled or uncoupled relation of the clutch members above a predetermined speed.

Another object of the invention is to provide a power transmission disconnect device as defined in the preceding paragraph wherein the speed-responsive means comprises a pair of flyweights which, in response to centrifugal force, can move to a position to prevent movement of the clutch members relative to each other, and the device has means for preventing operation of the flyweights below a certain predetermined speed of rotation of the driving clutch member.

Still another object of the invention is to provide for a power transmission disconnect device as defined in the preceding paragraphs wherein one of the clutch members is mounted on a member movable to move the clutch members into engagement or cause disengagement of the clutch members and with this movable member being remotely controlled through a motor-driven gear train including a worm and worm gear. The condition established by the remotely-controlled means is positively maintained, since the drive through the worm and worm gear is irreversible. Additionally, sensing means is provided to indicate the coupled condition of the clutch members.

Still another object of the invention is to provide a power transmission disconnect device with an operational interlock having a movable disconnect shaft, a driving clutch member mounted on said disconnect shaft, an input gear splined to said disconnect shaft, a driven clutch member connected to an output shaft, said clutch members being engageable to transmit power from the input gear to the output shaft, means urging said disconnect shaft in a direction to cause engagement between said clutch members, remotely operable means for moving said disconnect shaft against said urging means to disengage said clutch members, first means to prevent disengagement of the clutch members above a predetermined speed of the input gear, and second means to prevent engagement of the disengaged clutch members above a predetermined speed of the input gear.

A further object of the invention is to provide a power transmission disconnect device as defined in the preceding paragraph including a switch for detecting movement of the disconnect shaft to a position wherein the clutch members are fully engaged and wherein the speed-responsive means comprises a pair of flyweights positioned to coact with the disconnect shaft and, when said predetermined speed is exceeded, the flyweights are caused to move by centrifugal force to positions to coact with the disconnect shaft and maintain such shaft in whatever position it is in at that time.

BEST MODE FOR CARRYING OUT THE INVENTION

Figure 1:
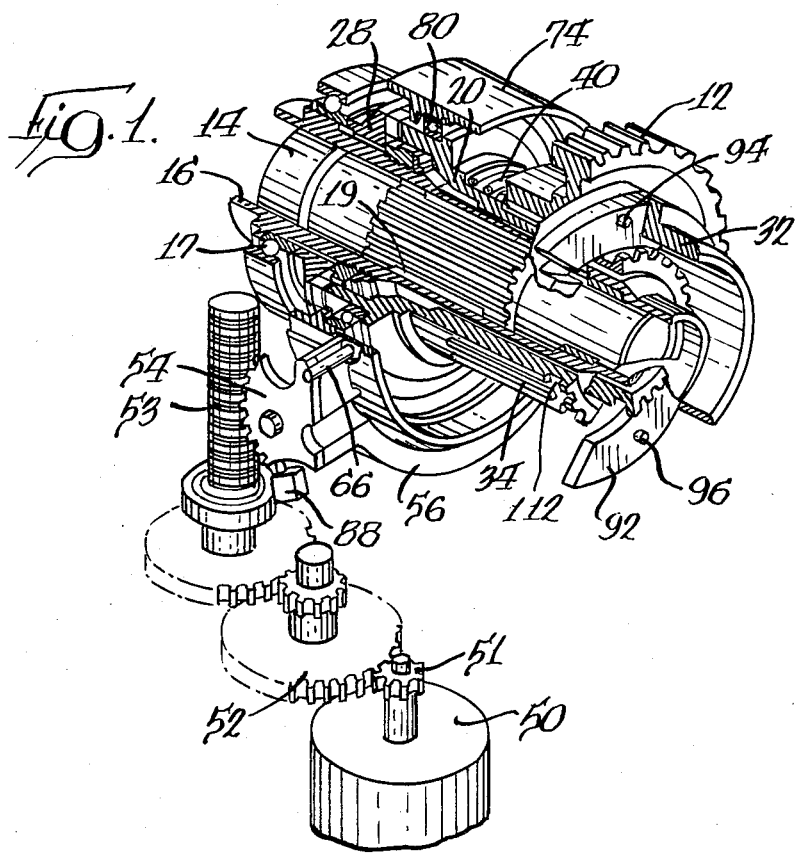
FIG. 1 is a fragmentary perspective view of the power transmission disconnect device with parts broken away.
Figure 2:
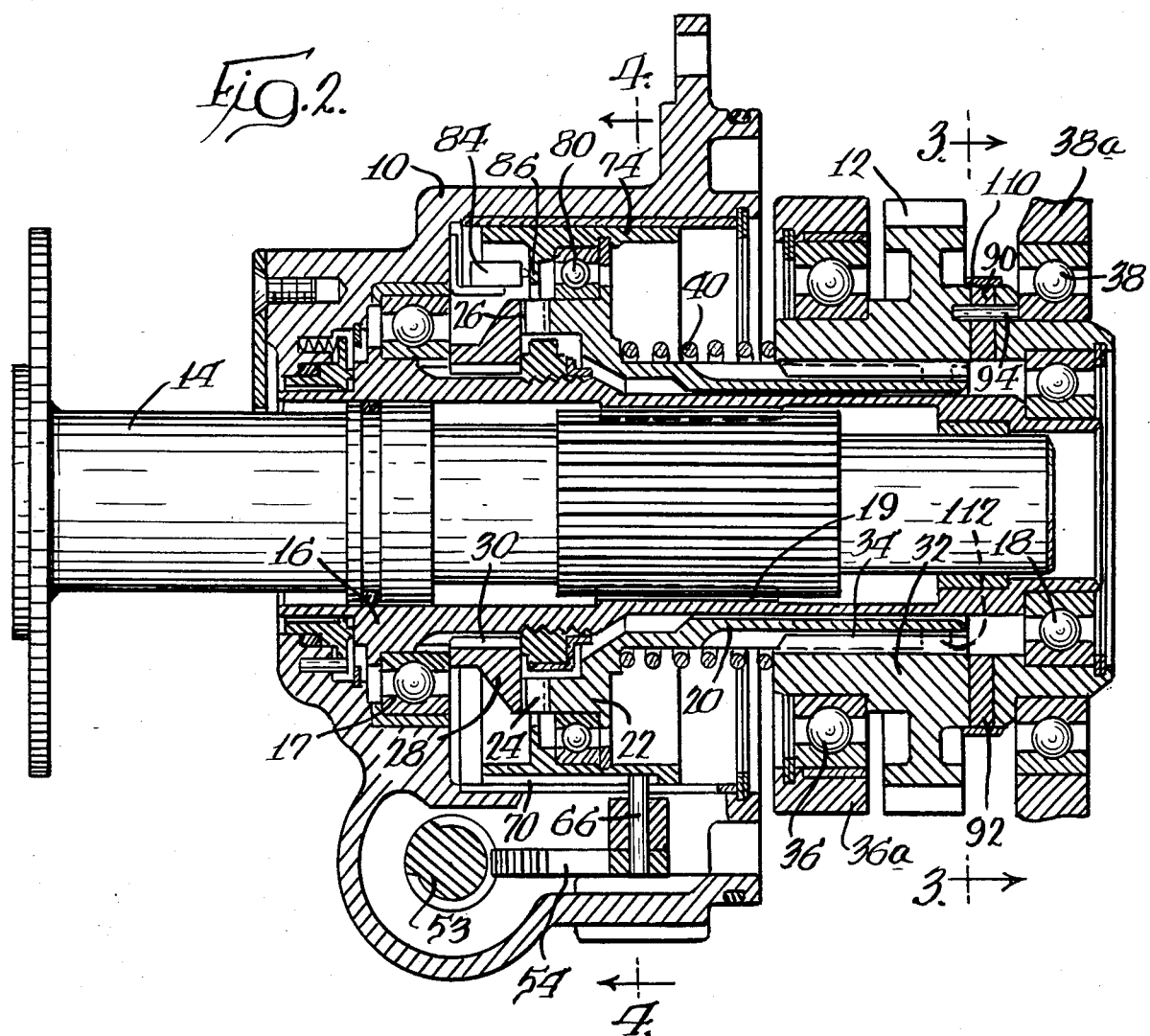
FIG. 2 is a central plan section of the power disconnect device as shown in FIG. 1.

The power transmission disconnect device is shown generally in FIGS. 1 and 2 and has a casing 10, shown in part in FIG. 2, for housing the operative mechanism and which is omitted in FIG. 1.

The power is transmitted through the power transmission disconnect device from an input gear 12 to a connecting shaft 14. The connecting shaft 14 extends within a tubular output shaft 16 rotatably supported within the casing 10 by a pair of bearings 17 and 18 and is splined thereto at 19.

A tubular disconnect shaft 20 surrounds the tubular output shaft 16 and is spaced therefrom. A driving clutch member 22 on the tubular disconnect shaft has jaw teeth 24 which mesh with jaw teeth 26 on a driven clutch member 28. The driven clutch member 28 is shown as splined at 30 to the tubular output shaft 16 for assembly purposes although the driven clutch member 28 and tubular output shaft 16 could be integral. The jaw teeth are configured to provide a lead-in ramp to guide the teeth into alignment when the clutch is brought into engagement.

The driving clutch member 22 is caused to rotate by the input gear 12. The input gear 12 has a tubular member in the form of a gear hub 32 surrounding a part of the tubular disconnect shaft 20 and slidably splined thereto as indicated at 34.

The tubular disconnect shaft 20 and the input gear 12 are rotatably supported by casing-mounted bearings 36 and 38 with the bearings mounted in casing parts 36a and 38a connected (not shown) to casing 10.

A return spring 40 surrounds the tubular disconnect shaft 20 and, at one end, engages the gear hub 32 and engages against the driving clutch member 22 to urge the driving and driven clutch members into coupled engaged relation. It is possible for the jaw teeth to abut upon attempted engagement and therefore the closing force is derived from a spring.

Figure 4:
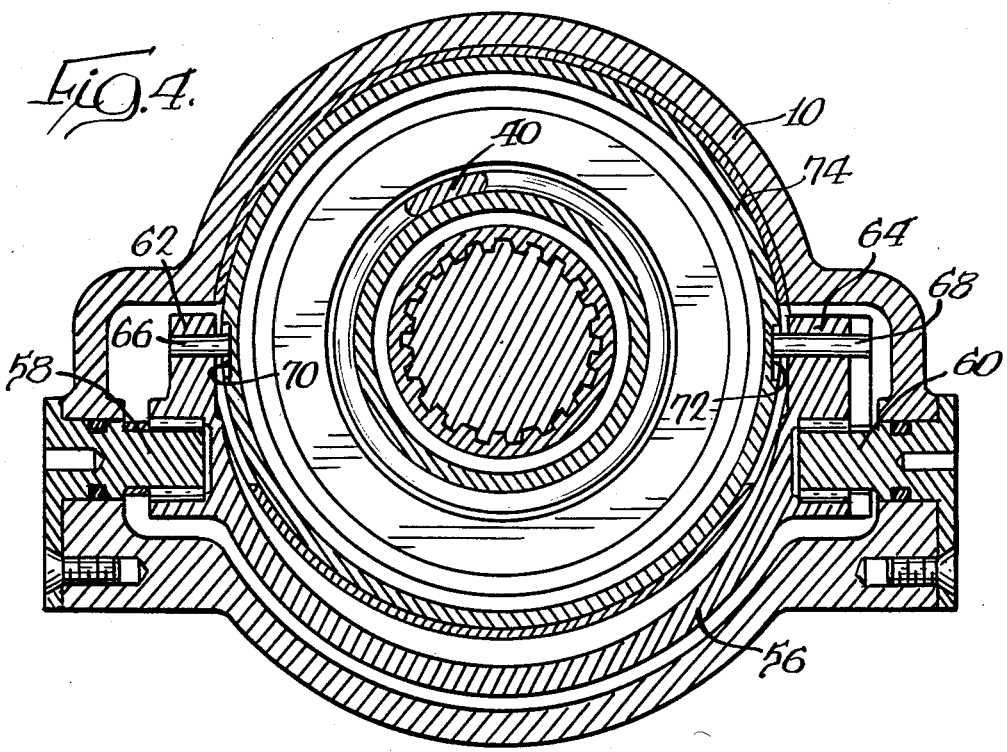
FIG. 4 is a vertical section, taken generally along the line 4—4 in FIG. 2.

The axial position of the tubular disconnect shaft 22 and, thus, the engaged or disengaged relation of the clutch is under the control of remotely-controllable means. This remotely-controllable means includes an electric motor 50 having an output shaft with a gear 51 which, through a spur gear reduction set 52, drives a worm 53 in driving engagement with a worm gear 54. The worm gear 54 is fixed to a throwout yoke 56 which is pivotable on casing-mounted trunnions 58 and 60 (FIG. 4). As seen in FIG. 4, the throwout yoke is a generally semi-cylindrical member having a pair of arms 62 and 64, each of which carries a pin 66 and 68, respectively. These pins coact with a pair of elongate slots 70 and 72 in a throwout sleeve 74 surrounding and in spaced relation to the tubular disconnect shaft 20.

With the clutch engaged, as shown in the drawings, the pins 62 and 68 are spaced a short distance from an end of the slots 70 and 72 whereby the return spring 40 can be effective to assure full engagement of the clutch members.

When the motor 50 is operated to rotate the worm 53 and cause clockwise movement of the worm gear 54 as viewed in FIG. 1, the pins 66 and 68 move a short distance to the end of the slots 70 and 72 and with further pivoting of the yoke the pins are effective to move the throwout sleeve 74 to the right, as viewed in FIG. 2, to shift the tubular disconnect shaft 20 to the right and move the clutch members apart with disengagement between the jaw teeth 24 and 26.

Movement of the throwout sleeve 74 causes movement of the tubular disconnect shaft 20 by a connection therebetween provided by a thrust bearing 80 as seen in FIG. 2. Movement of the tubular disconnect shaft 20 to the right results in compressing the return spring 40 whereby, upon reverse rotation of the motor 50 and counterclockwise pivoting of the worm gear 54, the pins 66 and 68 are caused to move in a direction to permit the throwout sleeve 74 to move to the left to reengage the clutch.

A switch 84 is mounted within the casing 10 in position for engagement by a flange 86 within the throwout sleeve 74 as seen in FIG. 2 to indicate full engagement of the clutch. In the event the teeth 24 and 26 do not fully interengage and, thus, the tubular disconnect shaft 20 does not return fully to the left, this condition is sensed by the switch 84. A switch 88, seen in FIG. 1, is associated with the worm gear 54 whereby, in the event the switch 84 is not actuated, the over-travel provided by the length of the slots 70 and 72 permits the worm gear to rotate in a counterclockwise direction to a position to engage the switch 88 and stop operation of the motor 50. This prevents motor stalling and possible motor burnout. A suitable circuit having the switches can indicate to an operator that the clutch is not fully engaged and the motor 50 can be operated through a cycle to withdraw the driving clutch member 22 and attempt to reengage the clutch.

Figure 3:
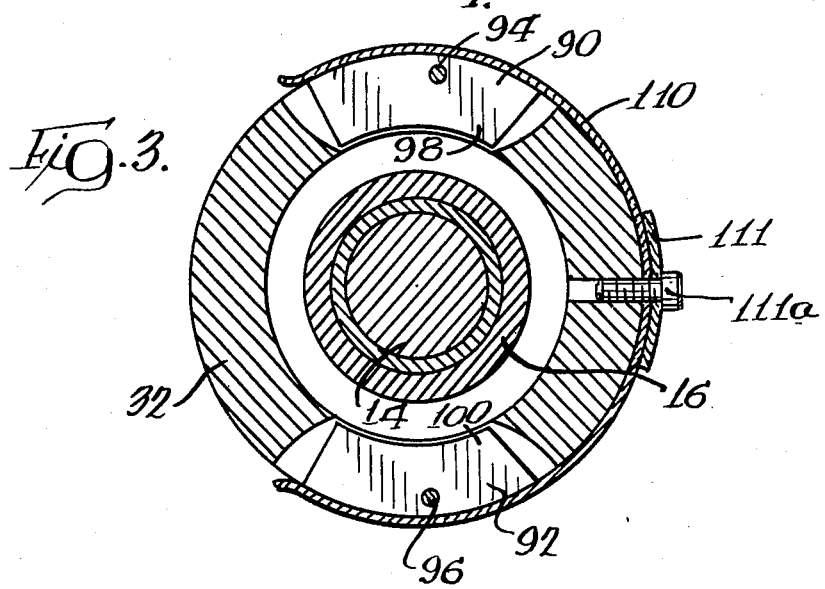
FIG. 3 is a vertical section, taken generally along the line 3—3 in FIG. 2.

An operational interlock to assure that the clutch can neither be engaged nor disengaged above a predetermined rotational speed of the input gear 12 is provided. This interlock is in the form of speed-responsive means having a pair of flyweights 90 and 92, shown particularly in FIG. 3, which are mounted in cutouts in the gear hub 32 and pivotable thereon by pins 94 and 96. In response to centrifugal force derived from rotation of the gear hub 32 above a predetermined speed, the flyweights will pivot about the pins 94 and 96 because of their unbalanced weight, with the result that the lighter weight parts 98 and 100 thereof will move inwardly to an interlock position providing an axial barrier. A first interlock position is with the tubular disconnect shaft 20 positioned as shown in FIG. 2, with the clutch engaged, wherein the parts 98 and 100 of the flyweights can move into obstructing relation with an end of the tubular disconnect shaft to prevent movement thereof of the right as viewed in FIG. 2. This will maintain the clutch engaged and this interlock is effective at a certain rated speed of rotation of the input gear 12 as set by spring means associated with the flyweights. This spring means is in the form of a generally C-shaped spring 110 which partially wraps around the gear hub 32 and with parts of the spring engaging the outer periphery of the flyweights. The spring is held in position by a disc 111 and a bolt 111a. Until the centrifugal force derived from a certain rated speed is sufficient to move the spring parts 110 outwardly, the flyweights are ineffective to move their parts 98 and 100 into an obstructing relation with an end of the tubular disconnect shaft 20.

In the event the clutch is disengaged, the flyweights are also effective to prevent reengagement above a certain rated speed because of the parts 98 and 100 of the flyweights being in position to lie within a peripheral groove 112 formed by notches in the external spline on the tubular disconnect shaft 20. This groove 112 is in alignment with the flyweights when the throwout yoke 56 has moved to a position to fully disengage the clutch members.

When the parts 98 and 100 of the flyweights have moved inwardly a sufficient distance, they touch the surface of the mounting cut-outs therefor in the gear hub 32 to limit the radial displacement of the heavier outer ends of the flyweights to prevent overstressing of the spring 110.

The circuit having switches 84 and 88 has an additional switch (not shown) engaged by the worm gear 54 when the latter has moved clockwise from the position shown in FIG. 2 to a position where the clutch is fully disengaged. The worm gear position indicates this since the movement thereof is indicative of the movement of the throwout sleeve 74 by engagement between the pins 66 and 68 and the ends of the slots 70 and 72.

With the structure described herein, the power transmission disconnect device provides for remote operation with positive position control of the clutch either engaged or disengaged and with an operational interlock to prevent change in clutch condition above some predetermined speed of rotation of the input gear 12, as for example, 30% of rated speed.

I claim:

1. A power transmission disconnect device with an operational interlock comprising, a movable disconnect shaft, a driving clutch member mounted on said disconnect shaft, a driven clutch member connected to an output shaft, said clutch members being engageable to transmit power to the output shaft, means for moving said disconnect shaft to either engage or disengage said clutch members, and means to prevent disengagement of the clutch members above a predetermined speed of the driving clutch member and prevent engagement of the disengaged clutch members above a predetermined speed of the driving clutch member.

2. A power transmission disconnect device as defined in claim 1 including a switch for detecting movement of the disconnect shaft to a position wherein said clutch members are fully engaged.

3. A power transmission disconnect device as defined in claim 1 wherein said means to prevent disengagement includes at least one flyweight having an operative position above said predetermined speed to lie across an end of said disconnect shaft to block movement thereof.

4. A power transmission disconnect device as defined in claim 1 wherein said means to prevent engagement includes an abutment on said disconnect shaft and at least one flyweight having an operative position above said predetermined speed to engage said abutment to block movement of the disconnect shaft.

5. A power transmission disconnect device as defined in either of claims 3 or 4 including spring means urging said flyweight away from said operative position and determining the predetermined speed of the input shaft at which the flyweight will move to said operative position.

6. A power transmission disconnect device with an operational interlock comprising, a movable disconnect shaft, a driving clutch member mounted on said disconnect shaft, an input gear splined to said disconnect shaft, a driven clutch member connected to an output shaft, said clutch members being engageable to transmit power from the input gear to the output shaft, means urging said disconnect shaft in a direction to cause engagement between said clutch members, remotely operable means for moving said disconnect shaft against said urging means to disengage said clutch members, first means to prevent disengagement of the clutch members above a predetermined speed of the input gear, and second means to prevent engagement of the disengaged clutch members above a predetermined speed of the input gear.

7. A power transmission disconnect device as defined in claim 6 including a switch for detecting movement of said disconnect shaft to a position wherein said clutch members are fully engaged.

8. A power transmission disconnect device as defined in claim 6 wherein said first means includes at least one flyweight having an operative position above said predetermined speed to lie across an end of said disconnect shaft to block movement thereof.

9. A power transmission disconnect device as defined in claim 6 wherein said second means includes means defining an abutment on said disconnect shaft and at least one flyweight having an operative position above said predetermined speed to engage said abutment to block movement of the disconnect shaft.

10. A power transmission disconnect device as defined in either of claims 8 or 9 wherein the speed-responsive means includes a pair of said flyweights, and spring means urging said flyweights away from said operative position and determining the predetermined speed of the input shaft at which the flyweights will move to said operative position.

11. A power transmission disconnect device as defined in claim 10 including means to limit the movement of the flyweights to prevent over-stressing of said spring means.

12. A power transmission disconnect device utilizing a disengageable jaw tooth clutch having driven and driving clutch members with interengaging teeth comprising, a tubular output shaft operatively connected to said driven clutch member, a tubular disconnect shaft surrounding and spaced from said tubular output shaft and having said driving clutch member thereon, a tubular member having an input gear surrounding a part of said tubular disconnect shaft and slidably splined thereto for driving said tubular disconnect shaft, a return spring surrounding a part of said tubular disconnect shaft and engageable therewith for urging the clutch members into engagement, a movable throwout sleeve surrounding a part of the tubular disconnect shaft, a thrust bearing positioned between said throwout sleeve and said tubular disconnect shaft for transmitting motion of the throwout sleeve to said tubular disconnect shaft, a pivotal throwout yoke positioned externally of said throwout sleeve and connected therewith whereby pivotal movement of said throwout yoke imparts movement to said throwout sleeve, and means for pivoting said throwout yoke to move said throwout sleeve against the action of the return spring and relative to said tubular member and input gear and disengage the jaw tooth clutch.

13. A power transmission disconnect device as defined in claim 12 wherein said means for pivoting the throwout yoke includes a worm gear connected to said throwout yoke, and a motor-driven worm engaging said worm gear.

14. A power transmission disconnect device as defined in claim 12 including speed-responsive means for controlling engagement and disengagement of the jaw tooth clutch.

15. A power transmission disconnect device as defined in claim 14 wherein said speed-responsive means includes a pair of flyweights rotatable with the tubular member having the input gear and positionable to have a part thereof in line with an end of the tubular disconnect shaft to prevent clutch disengaging movement thereof, and an external groove in said tubular disconnect shaft aligned with said flyweights when the jaw tooth clutch is disengaged to receive said parts of the flyweights.

16. A power transmission disconnect device as defined in claim 15 wherein a spring is associated with each flyweight to prevent coaction of said flyweight parts with said tubular disconnect shaft below a certain speed of said input gear.

17. A power transmission disconnect device as defined in claim 12 wherein said connection between the throwout sleeve and throwout yoke is a pin and slot connection to permit continued movement of the throwout yoke if the throwout sleeve is prevented from completing clutch-engaging movement by incomplete engagement of the clutch members.

18. A power transmission disconnect device as defined in claim 17 including a switch to sense completed movement of the throwout yoke.

19. A power transmission disconnect device as defined in claim 17 including a switch for detecting movement of said tubular disconnect shaft to a position wherein said clutch members are fully engaged.

* * * * *